(12) United States Patent
Schäfer

(10) Patent No.: US 7,540,136 B2
(45) Date of Patent: Jun. 2, 2009

(54) FIELD CHOPPER AND PRESS ROLLS

(75) Inventor: Rainer Schäfer, Zweibrücken (DE)

(73) Assignee: Deere & Company, Moline, IL (US)

( * ) Notice: Subject to any disclaimer, the term of this patent is extended or adjusted under 35 U.S.C. 154(b) by 68 days.

(21) Appl. No.: 11/633,828

(22) Filed: Dec. 5, 2006

(65) Prior Publication Data

US 2007/0137160 A1 Jun. 21, 2007

(30) Foreign Application Priority Data

Dec. 15, 2005 (DE) .................. 10 2005 059 953

(51) Int. Cl.
*A01D 45/02* (2006.01)
(52) U.S. Cl. .......................................... 56/60
(58) Field of Classification Search ............ 56/60, 56/10.2 G, 10.2 R, 10.2 H, 10.2 J; 460/1, 460/2, 6; 241/30, 37, 35, 222, 101.763, 101.2
See application file for complete search history.

(56) References Cited

U.S. PATENT DOCUMENTS

| | | | | |
|---|---|---|---|---|
| 2,864,224 A * | 12/1958 | West | ............................ | 56/2 |
| 2,906,393 A * | 9/1959 | West | .......................... | 100/153 |
| 3,431,712 A | 3/1969 | Probsting | | |
| 4,059,234 A * | 11/1977 | Purrer | ....................... | 241/222 |
| 4,322,937 A * | 4/1982 | Hollmann | ...................... | 460/3 |
| 4,678,129 A * | 7/1987 | Dallinger | ............. | 241/101.742 |
| 4,805,385 A * | 2/1989 | Bohman et al. | ........... | 56/10.2 J |
| 5,498,207 A * | 3/1996 | Cappon et al. | ............. | 460/119 |
| 5,657,621 A * | 8/1997 | Mendes et al. | ............ | 56/16.4 D |
| 5,795,221 A * | 8/1998 | Diekhans | ........................ | 460/6 |
| 5,797,250 A * | 8/1998 | Augie | ....................... | 56/10.2 J |
| 5,862,656 A * | 1/1999 | Gernert | ........................ | 56/105 |
| 5,901,535 A * | 5/1999 | Duckinghaus et al. | ... | 56/10.2 G |
| 6,105,347 A * | 8/2000 | Behnke | ...................... | 56/10.2 J |
| 6,116,529 A * | 9/2000 | Fisher, Jr. et al. | ..... | 241/101.763 |
| 6,318,056 B1 * | 11/2001 | Rauch et al. | .............. | 56/10.2 J |
| 6,397,570 B1 * | 6/2002 | Bohrer et al. | ............. | 56/10.2 J |
| 6,421,990 B1 * | 7/2002 | Ohlemeyer et al. | ...... | 56/10.2 R |
| 6,560,953 B2 * | 5/2003 | Rauch | ............................ | 56/64 |
| 6,584,755 B2 * | 7/2003 | Holtkotte | .................. | 56/10.2 B |
| 7,140,169 B2 * | 11/2006 | Ameye et al. | ................ | 56/11.9 |

FOREIGN PATENT DOCUMENTS

| | | |
|---|---|---|
| DE | 36 33 721 | 7/1987 |
| DE | 195 39 143 | 4/1997 |
| EP | 0 519 209 | 12/1992 |
| EP | 1 277 395 | 1/2003 |
| SU | 1033045 A * | 8/1983 |

OTHER PUBLICATIONS

European Search Report, Aug. 23, 2007, 4 Pages.

* cited by examiner

Primary Examiner—Árpád Fábián-Kovács

(57) ABSTRACT

The invention relates to a field chopper having at least one rotatable lower rough-press roll and at least one rotatable upper rough-press roll. Between the rough-press rolls crop is pressed and fed to a chopping drum where blades chop the crop. A space is defined down stream of the moveable rough-pressing roll between the chopping drum, the stream of pressed crop and the movable rough-press roll. Located in this space is a pressing element that acts on the pressed crop and which exerts a rough-pressing effect on the pressed crop downstream of the movable rough-press roll and upstream of the chopping drum.

8 Claims, 2 Drawing Sheets

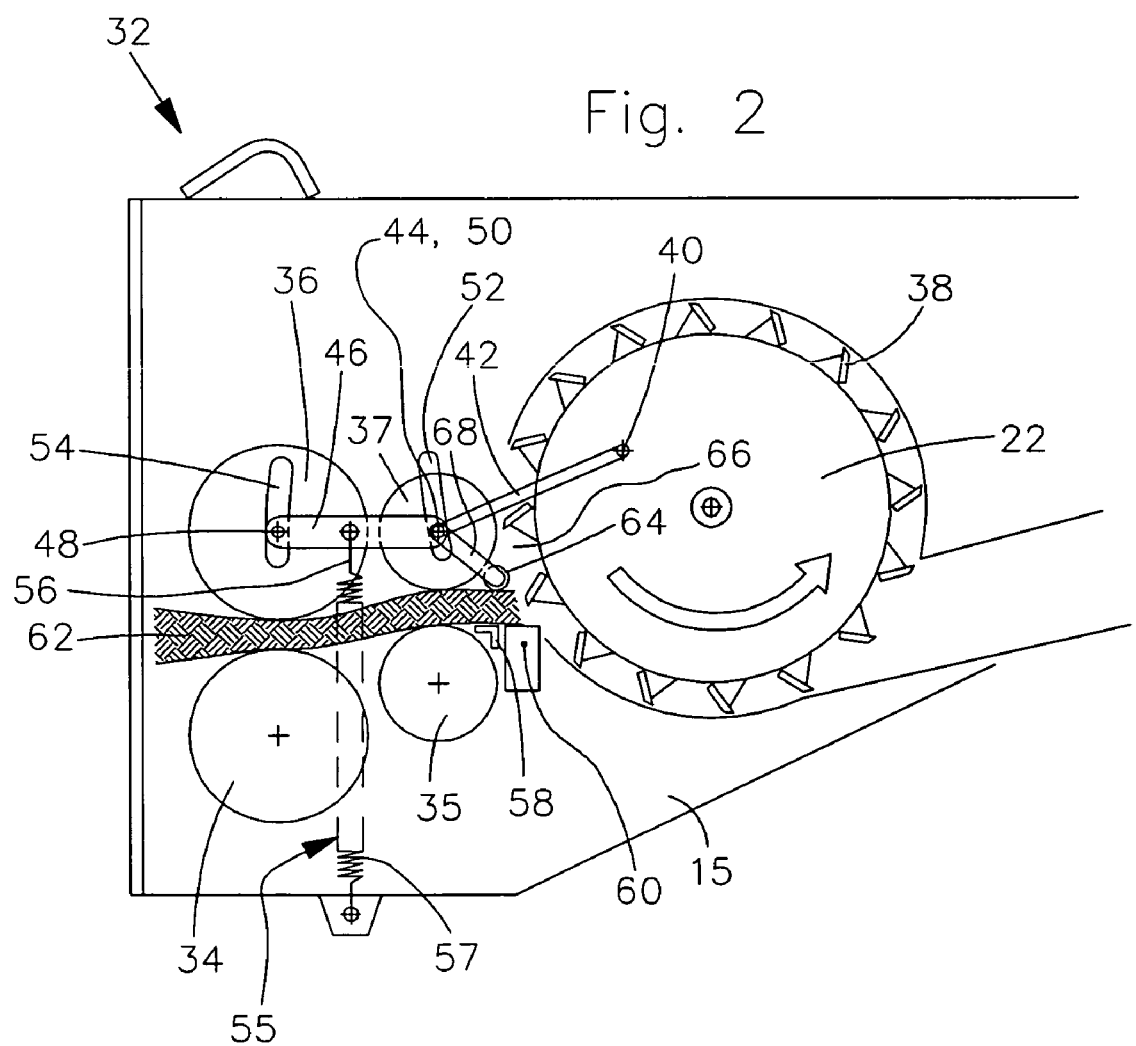

FIELD CHOPPER AND PRESS ROLLS

BACKGROUND

1. Field of the Invention

The present invention generally relates to field choppers and, more particularly, to preventing or minimizing the fanning out of pressed crop before their cutting by the cutting drum.

2. Description of the Related Technology

Field choppers are used in agriculture to cut or collect crop from a field (by means of a crop pick-up device), to feed the crop to a chopping device (usually a chopping drum or a slice chopper) via a feeding device to chop the crop and to eject the crop onto a transport vehicle (usually after being accelerated by means of a blower) through an ejection elbow that is adjustable in its position. In most cases, the harvested plants are used as silage for feeding animals or, in recent times, for biogas production.

For field choppers in current use, the feeding device comprises two or more lower rough-press rolls mounted rigidly on the frame of the field chopper and with which two or more upper rough-press rolls interact (see EP 0 519 209 A or U.S. Pat. No. 6,539,693). The upper rough-press rolls are mounted so that they can move in height against the force of one or more springs. This allows the upper rough-press rolls to deflect upwards when taking in crop. The spring has the task of applying a defined force against the upper rough-press rolls so that, on one hand, they can pre-compress the crop in interaction with the lower rough-press rolls when taking in the crop and, on the other hand, they make it possible to take in the crop and transport it to the chopping drum with the help of a rolling force. The actual cutting process is performed by the chopping drum, which is equipped with rotating blades that act against a stationary cutting blade.

The rear, upper rough-press roll is typically mounted on a rocker (see EP 0 519 209 A or DE 102 35 096 A) and can move upwards on a curved path against the force of the spring when crop is being taken in. The curved path is provided so as to guide the outer perimeter of the upper rough-press roll as close as possible to the outer diameter of the chopping drum. As a result of the upward movement of the upper roll and the spacing between its surface interacting with the crop and the chopping drum, a part of the rough-pressing effect is lost and the pressed crop decompresses and, particularly its upper half, fans out slightly downstream of the rough-press roll. When this occurs, if a rotating blade of the chopping drum comes into contact with these upper parts of the pressed crop, the fanned out material is partially compressed again and cut. However, it can be observed that, especially thin stalks and husks, the crop can be pulled through and past the stationary cutting blade by the rotating blade edge, resulting in this portion of the crop being cut for the first time by the next or a subsequent blade. This produces undesired overlengths in the cut crop, which can lead to problems in further use as silage, e.g., unacceptable for feeding animals.

In another known construction, as seen in EP 1 277 395 A, a field chopper is provided with a stationary, flat guide element arranged above a stationary cutting blade. The guide element divides the crop flow into two sub-streams, one flowing above the other. With this dividing of the flows, a sufficient rough-pressing effect cannot be achieved by the guide element.

SUMMARY

The problem forming the basis of the invention is the providing of a field chopper with an improved rough-pressing effect.

In achieving this effect, a field chopper is provided, in one aspect of the invention, with at least one lower and one upper rough-press roll, which during the harvesting operation, convey pressed crop to a chopping drum equipped with blades interacting with a counter or stationary blade in order to chip the pressed crop into small pieces. The rough-press roll located opposite of the counter blade (usually, but not necessarily, involves the upper rough-press roll) can move orthogonal to the flow direction of the pressed crop and is tensioned toward the other rough-press roll (usually the lower rough-press roll) by a biasing force, which may be generated by a spring force and/or a hydraulic cylinder, in order to achieve the desired rough-pressing effect. Because the chopping drum is arranged immediately downstream of the rough-press rolls, there is no other rough-press roll between the chopping drum and the mentioned rough-press rolls. The outer perimeter or diameter of the movable rough-press roll extends nearly to the periphery of the chopping drum. To achieve a rough-pressing effect on the pressed crop in the area downstream of the movable rough-press roll and upstream of the chopping drum, another rotatable pressing element or roll is provided at this position. Consequently, this additional pressing element is arranged in the approximately triangular space defined by the pressed crop located downstream of the movable rough-press roll, the chopping drum and the movable rough-press roll.

The additional rotatable rough-press element is mounted such that it can move generally perpendicular to the movement direction of the pressed crop and such that it can be tensioned toward the crop. Alternatively, it could be mounted rigidly. This rotating pressing element has the advantage over a non-rotating element that the pressed crop is not decelerated and banked up by the element. The additional rotating pressing element can be provided such that it runs freely (i.e., is not driven) or it can be driven. In the latter instance, it is preferred to drive the additional pressing element with a circumferential speed corresponding to the circumferential speed of the movable rough-press roll. In its construction, it is preferred that the additional pressing element is cylindrical and equipped with a smooth surface, although drivers or the like could also be formed on its surface. It also may have a significantly smaller diameter than the movable rough-press roll.

The pressing element can preferably move with the movable rough-press roll. It can be mounted, for example, on the rocker that supports the movable rough-press roll and which moves on a curved path guided as close as possible to the outer diameter of the chopping drum.

In this way, fanning out of the pressed crop downstream of the last rough-press roll and before the chopping drum is prevented. The rough pressing of the pressed crop is maintained until as close as possible to the outer diameter of the chopping drum, which leads to improved cut quality and prevention of undesirable overlengths in the out crop.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 2 is an enlarged schematic side view of a portion of the field chopper seen in FIG. 1.

DETAILED DESCRIPTION OF THE INVENTION

Figure 1:
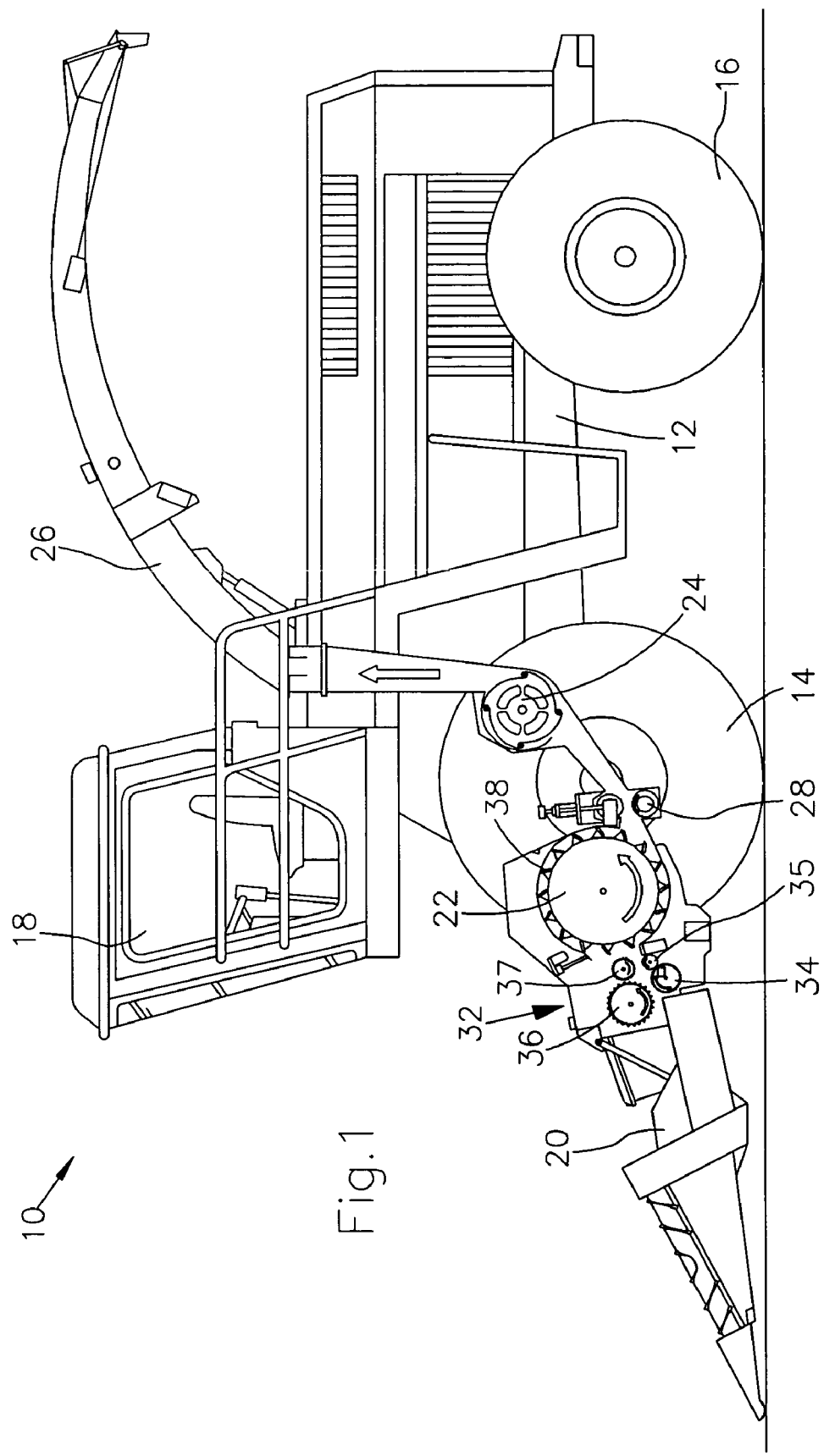
FIG. 1 is a side elemental view, in schematic, of a field chopper with a feeding device and embodying the principles of the present invention.

Referring now to FIG. 1, a self-propelled field chopper 10 embodying the principles of the present invention is shown therein. The field chopper 10 is built on a frame 12, which is supported by front wheels and steerable rear wheels 14 and 16, respectively. The field chopper 10 is controlled from a driver's cabin 18, from which a crop pick-up device 20, illustrated in the present embodiment as a corn header, can be seen. Material, e.g., corn, grass, or the like, is picked up from the ground by means of the a crop pick-up device 20 and is fed to a chopping drum 22, equipped with blades 38, which chops the crop into small pieces and ejects the crop to a conveying device 24. A feeding device 32 is arranged in a take-in channel of the field chopper 10 and includes lower rough-press rolls 34, 35 and upper rough-press rolls 36, 37 that cooperatively pass the crop to the chopping drum 22. The chopped crop leaves the field chopper 10 via a rotatable discharge chute 26 and is dispensed onto a trailer or other transport vehicle driving next to the chopper 10. Between the chopping device 22 and the conveying device 24 a regrinding device 28 is provided. The regrinding device 28 is constructed from two processor rolls, arranged one above the other, and through which the chopped crop to be conveyed is fed tangentially to the conveying device 24.

As seen in the enlarged schematic view of the feeding device 32 and the chopping drum 22 in FIG. 2, the lower rough-press rolls 34, 35 are rotatably mounted on a take-in housing 15, which is removably supported on the frame 12 of the field chopper 10. The lower rough-press rolls 34, 35 are driven in rotation, during the harvesting operation, by means of a length cutting gear of the crop pick up device 20. Such length cutting gear is shown in U.S. Pat. No. 6,810,649, the teachings of which are herein incorporated by reference.

Located above the lower rough-press rolls 34, 35 are the upper rough-press rolls 36, 37, which are rotatable about shafts supported in front bearing positions 48 and rear bearing positions 50, respectively, of rockers 46. The rockers 46 are also rotatably mounted about axes running parallel to the shafts of the rough-press rolls 34, 35, 36, 37, particularly in the free ends 44 of pivot elements 42. These pivot elements 42 are in turn supported about axes running parallel to the rotational axis of the rough-press rolls 34-37 at rotational points 40 on both sides of the take-in housing 15. Supported in this manner, the shafts of the upper rough-press rolls 36, 37 can freely move upwards and downwards with the rockers 46 in the area of slots 52, 54 that are defined in the take-in housing 15. Like the lower rough-press rolls 34, 35, the shafts of the upper rough-press rolls 36, 37 are driven during harvesting operations by the length cutting gear. This driving, however, is in the opposite sense relative to the lower rough-press rolls 34, 35.

A first end 56 of a spring 55, which may be constructed as a tension (coil) spring or similar means, is attached to the rocker 46 and a second end 57 is attached to the take-in housing 15. As will be appreciated by those skilled in the art, springs 55 can be connected to opposing rockers 46 located on both sides of the rough-press rolls 34, 35, 36, 37 and the take-in housing 15. In another embodiment, a spring 55 is located only on one side of the take-in housing 15, and with the rockers 46 on both sides of the take-in housing 15 being connected together by a transverse connection (not shown).

Downstream of the rear lower rough-press roll 35, toward the right in FIG. 2, is a scraper 58 and a counter blade 60. The blades 38 of the chopping drum 22 interact with the counter blade 60 in order to chop into small pieces the mat of compressed crop 62 that is pulled between the rough-press rolls 34-37 and which is compacted by the upper rough-press rolls 36, 37 tensioned via the spring 55 toward the lower rough press rolls 34, 35.

Downstream of the upper rough-press roll 37, a space 66 (with an approximately triangular cross section) is defined by the pressed crop 62, the chopping drum 22 and the rough-press roll 37. Because there is no upper limit for the crop, it is possible for the pressed crop 62 to expand upwards in this space 66 in conventional field choppers. This possible expansion of the pressed crop 62 has disadvantageous effects on the cutting quality because the crop cannot be held adequately from above when engaged by the blades 38 of the chopping drum 22.

To prevent this disadvantage, the present invention provides a cylindrical pressing element 64 in the space 66. The pressing element 64 extends parallel to the axes of the rough-press rolls 34-37 and the chopping drum, over their entire widths. The pressing element 64 is further provided with a smooth surface and is mounted rotatably (rotating freely or drivenly coupled to the rough-press roll 37) on a holder 68, which may be attached to the rocker 46.

Consequently, the pressing element 64 can move with the upper rough-press rolls 36, 37 in the vertical direction and is tensioned by the spring 55 toward the pressed crop 62. The pressing element 64 extends a distance into the space 66 such that it prevents the pressed crop 62 from fanning out downstream of the rough-press roll 37. This in turn leads to improved cutting quality, especially to a prevention of overlengths.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A field chopper comprising: a chopper drum mounted for rotation about a transverse axis and including blades distributed about its periphery; a fixed transverse counter blade located for interacting with said blades of said chopper drum for cutting a compressed mat of crop into pieces as the mat is fed in a rearward direction across said counter blade; at least one rotatable lower rough-press roll mounted for rotation about a fixed axis extending parallel to said transverse axis, with said lower rough-press roll being located directly upstream of said counter blade and having a top peripheral surface located at a height approximately equal to a height of a top surface of said counter blade; at least one rotatable upper rough-press roll located approximately vertically above said lower rough-press roll and being mounted for vertical movement towards and away from said lower rough-press roll; a tensioning arrangement connected to, and resisting upward movement of, said upper rough press roll for forming said compressed mat of crop as crop is fed between said lower and upper rough-press rolls to said chopper drum; a holder mounted for movement with said at least one upper rough-press roll and extending toward said counter blade; a pressing element being mounted to said holder for rotation with the holder disposing said pressing element for contacting said compressed mat of crop at a location immediately upstream of a cylindrical path traced by said cutting blades, whereby said pressing element substantially prevents expansion of said compressed mat of crop prior to being engaged by said cutting blades.

2. The field chopper according to claim 1, wherein a gap exists between an upper part of said lower rough-press roll and said counter blade; a transverse scraper being located in, and substantially filling, said gap and having an upper surface located at approximately said height of said counter blade; and the pressing element being positioned vertically above said scraper.

3. The field chopper according to claim 1, wherein the pressing element is free-running.

4. The field chopper according to claim 1, wherein the pressing element is driven.

5. The field chopper according to claim 1, wherein the pressing element is cylindrical and has a periphery located approximately on tangents to said upper rough-press roll and to a cylindrical path traced by said blades of said chopping drum.

6. The field chopper according to claim 1, wherein the pressing element is mounted for movement with the upper rough-press roll.

7. The field chopper according to claim 1, and further including a take-in housing; a rocker being mounted to said take-in housing for pivotal movement; said upper rough-press roll being mounted on said rocker.

8. The field chopper according to claim 7 wherein the pressing element is connected to the rocker.

* * * * *